(12) United States Patent
Rao et al.

(10) Patent No.: US 12,707,239 B2
(45) Date of Patent: Aug. 11, 2026

(54) ONE-SHOT TRANSMISSION FOR V2X MESSAGING

(71) Applicants: FORD GLOBAL TECHNOLOGIES, LLC, Dearborn, MI (US); University of Central Florida Research Foundation, Inc., Orlando, FL (US)

(72) Inventors: Jayanthi Rao, West Bloomfield, MI (US); Ivan Vukovic, Birmingham, MI (US); Yaser Pourmohammadi Fallah, Orlando, FL (US); MD Saifuddin, Orlando, FL (US); Mahdi Zaman, Orlando, FL (US)

(73) Assignees: Ford Global Technologies, LLC, Dearborn, MI (US); University of Central Florida Research Foundation, Inc., Orlando, FL (US)

( * ) Notice: Subject to any disclaimer, the term of this patent is extended or adjusted under 35 U.S.C. 154(b) by 572 days.

(21) Appl. No.: 17/819,816

(22) Filed: Aug. 15, 2022

(65) Prior Publication Data

US 2023/0057331 A1 Feb. 23, 2023

Related U.S. Application Data

(60) Provisional application No. 63/234,067, filed on Aug. 17, 2021.

(51) Int. Cl.
*H04W 4/46* (2018.01)
*H04W 72/12* (2023.01)

(52) U.S. Cl.
CPC ............ *H04W 4/46* (2018.02); *H04W 72/12* (2013.01)

(58) Field of Classification Search
CPC ................................ H04W 4/46; H04W 72/12
See application file for complete search history.

(56) References Cited

U.S. PATENT DOCUMENTS 10,757,030 B2 8/2020 Loehr et al.
10,779,189 B2 9/2020 Khoryaev et al.
10,863,553 B2 * 12/2020 Lee ...................... H04W 72/23
2018/0160418 A1 * 6/2018 Luo .................. H04W 72/1263
(Continued)

FOREIGN PATENT DOCUMENTS

WO 2020106643 A1 5/2020

OTHER PUBLICATIONS

5G Automotive Association, V2X Functional and Performance Test Report; Test Procedures and Results.
(Continued)

*Primary Examiner* — Ricky Q Ngo
*Assistant Examiner* — Stephen N Steiner
(74) *Attorney, Agent, or Firm* — Joseph Zane; Brooks Kushman P.C.

(57) ABSTRACT

A sequence of connected messages is transmitted using Semi-Persistent Scheduling (SPS) of a predefined period. A random value for a 1-shot duration timer is set, the random value being chosen as being between a minimum and a maximum multiple of the predefined period. Responsive to expiration of the 1-shot duration timer, 1-shot resources are allocated for a 1-shot transmission, independent of SPS-allocated resources of the SPS, and a next packet of the sequence of connected messages is transmitted as a 1-shot message using the 1-shot resources instead of using the SPS-allocated resources of the SPS.

19 Claims, 6 Drawing Sheets

(56) References Cited

U.S. PATENT DOCUMENTS

2021/0144667 A1* 5/2021 Lepp ........................ H04L 47/24
2022/0046596 A1* 2/2022 Chen .................. H04W 72/0446
2022/0159638 A1* 5/2022 Fong ...................... H04W 72/20
2022/0279393 A1* 9/2022 Di Girolamo ........ H04W 72/02
2023/0007525 A1* 1/2023 Zhu ................... H04W 28/0215

OTHER PUBLICATIONS

Bazzi, Congestion Control Mechanisms in IEEE 802.11p and Sidelink C-V2X, arXiv:2001.08495v1 [cs.NI] Jan. 23, 2020.
C-V2X Performance Assessment Project, CAMP LLC, Cellular V2X Device-to-Device Communication Consortium, Dec. 5, 2019.
Updates on C-V2X Standardization in ETSI and C-V2X Deployments Globally, Qualcomm Technologies, Inc., Mar. 5, 2019.

* cited by examiner

ONE-SHOT TRANSMISSION FOR V2X MESSAGING

CROSS-REFERENCE TO RELATED APPLICATIONS

This application claims the benefit of U.S. provisional application Ser. No. 63/234,067 filed Aug. 17, 2021, the disclosure of which is hereby incorporated in its entirety by reference herein.

TECHNICAL FIELD

Aspects of the present disclosure generally relate to 1-shot transmissions for cellular vehicle-to-everything (C-V2X) messaging.

BACKGROUND

Vehicle-to-everything (V2X) communication allows vehicles to exchange information with other vehicles, as well as with infrastructure, pedestrians, networks, and other devices. Vehicle-to-infrastructure (V2I) communication enables applications to facilitate and speed up communication or transactions between vehicles and infrastructure.

SUMMARY

In one or more illustrative examples, a system for performing duration-based 1-shot messaging is provided. The system includes a transceiver and a controller. The controller is configured to transmit a sequence of connected messages using Semi-Persistent Scheduling (SPS) of a predefined period, set a random value for a 1-shot duration timer, the random value being chosen as being between a minimum and a maximum multiple of the predefined period, and responsive to expiration of the 1-shot duration timer, allocate 1-shot resources for a 1-shot transmission, independent of SPS-allocated resources of the SPS, and transmit a next packet of the sequence of connected messages as a 1-shot message using the 1-shot resources instead of using the SPS-allocated resources of the SPS.

In one or more illustrative examples, a method for performing duration-based 1-shot messaging is provided. A sequence of connected messages is transmitted using SPS of a predefined period. A random value for a 1-shot duration timer is set, the random value being chosen as being between a minimum and a maximum multiple of the predefined period. Responsive to expiration of the 1-shot duration timer, 1-shot resources are allocated for a 1-shot transmission, independent of SPS-allocated resources of the SPS, and a next packet of the sequence of connected messages is transmitted as a 1-shot message using the 1-shot resources instead of using the SPS-allocated resources of the SPS.

In one or more illustrative examples, a non-transitory computer-readable medium includes instructions for performing duration-based 1-shot messaging that, when executed by a controller in communication with a V2X transceiver, cause the controller to perform operations. The operations include to transmit a sequence of connected messages using SPS of a predefined period; to set a random value for a 1-shot duration timer, the random value being chosen as being between a minimum and a maximum multiple of the predefined period; and to responsive to expiration of the 1-shot duration timer, allocate 1-shot resources for a 1-shot transmission, independent of SPS-allocated resources of the SPS, and transmit a next packet of the sequence of connected messages as a 1-shot message using the 1-shot resources instead of using the SPS-allocated resources of the SPS.

DETAILED DESCRIPTION

Figure 1:
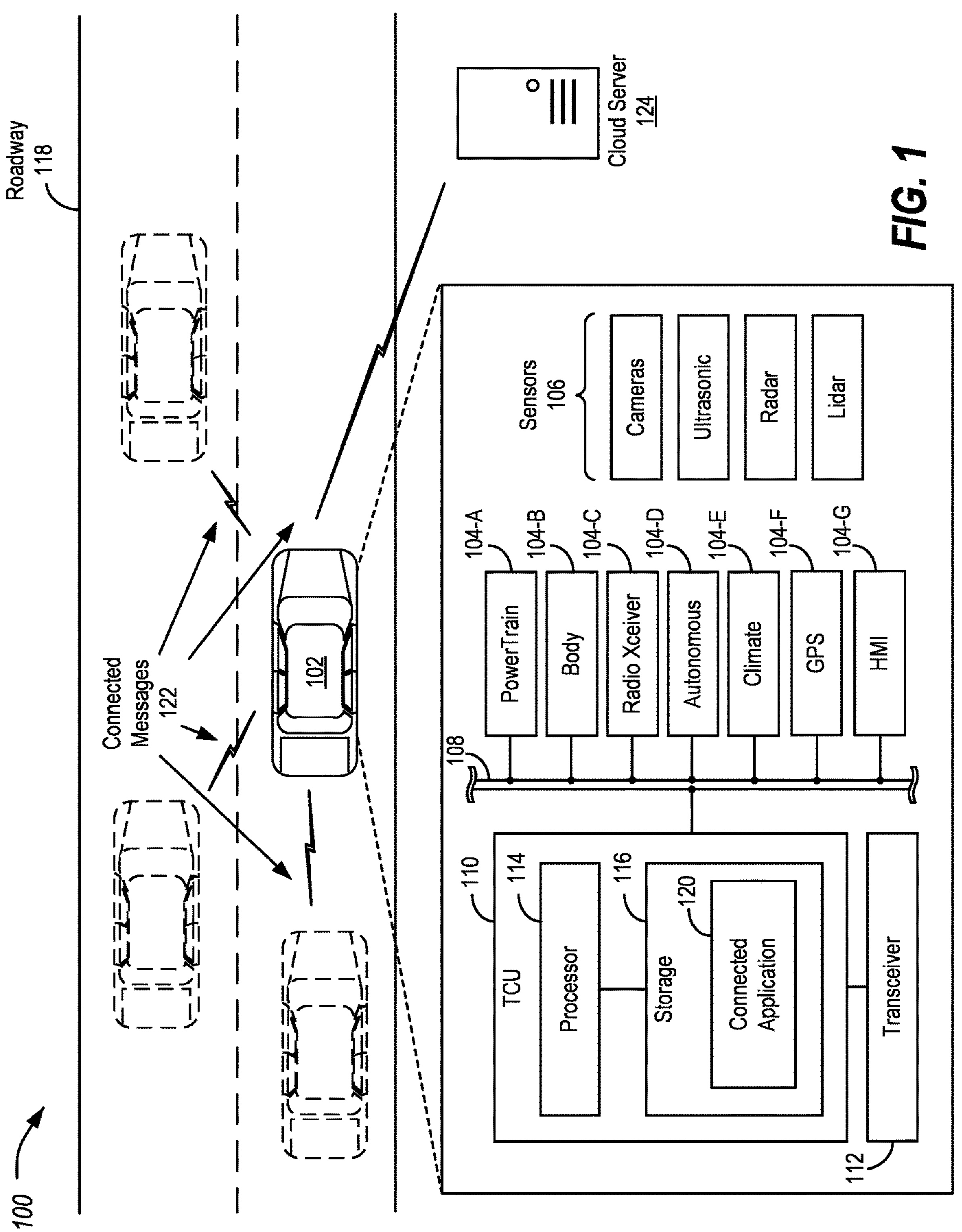
FIG. 1 illustrates an example system for the use in vehicles performing duration-based 1-shot messaging over V2X.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Using C-V2X communication, vehicles broadcast BSMs to other vehicles around them. This may be done to enable V2X applications such as Electronic Emergency Brake Light (EEBL), Intersection Movement Assist (IMA) as some examples. Information Age (IA) is a metric that is used to measure the age of the BSM information at the receiver for vehicles around the receiver. The higher the IA, the higher the probability that the vehicle has accumulated tracking errors due to changes in heading, acceleration, etc. In dense vehicle environments, the IA distribution for BSM packets can have long tails. This can mean that with a low (but non-zero) probability, vehicles can miss multiple consecutive packets from nodes within their range.

In C-V2X system, the medium access layer on a node may allocate resources in the time and frequency domains for the V2X applications. This allocation may be used for 5-15 transmissions based on a randomly chosen counter within that interval. When the counter reaches 0, resources may be reselected, for instance, with a probability of 20%.

The resources may be selected by examining the energy measured in resource blocks for a certain length of time. Yet, when there are many vehicles, it is possible for multiple vehicles to choose the same radio resources or at least time intervals (if two packets use the same time slot or 1 ms subframe they would be invisible to their corresponding transmitters due to the half-duplex limitations of transceivers. This can happen even at low loads). The probability increases with the number of vehicles. In these cases, that the resources may be used for multiple BSM transmissions implies that persistent collisions may occur leading to consecutive packet losses. This phenomenon may erode a vehicle's ability to track other vehicle in support of the V2X applications.

As discussed in detail herein, a system for performing duration-based 1-shot messaging is provided. The system includes a transceiver and a controller. The controller is configured to transmit a sequence of connected messages using Semi-Persistent Scheduling (SPS) of a predefined period, set a random value for a 1-shot duration timer, the random value being chosen as being between a minimum and a maximum multiple of the predefined period, and responsive to expiration of the 1-shot duration timer, allocate 1-shot resources for a 1-shot transmission, independent of SPS-allocated resources of the SPS, and transmit a next packet of the sequence of connected messages as a 1-shot message using the 1-shot resources instead of using the SPS-allocated resources of the SPS. By using this improved approach, transmission of the 1-shot message may avoid the possibility of persistent collisions and consecutive packet losses that can occur with periodic transmission by multiple vehicles.

FIG. 1 illustrates an example system 100 for the use of vehicles 102 performing duration-based 1-shot messaging over V2X. The vehicle 102 may include various types of automobile, crossover utility vehicle (CUV), sport utility vehicle (SUV), truck, recreational vehicle (RV), boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV).

The vehicle 102 may be an Automated Vehicle (AV) or a vehicle driven by a driver with driver assistance features. These AV or driver assistance features may be supported via received V2X data. The level of automation may vary between variant levels of driver assistance technology to a fully automatic, driverless vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs). It should be noted that while automotive vehicles 102 are being used as examples of traffic participants, other types of traffic participants may additionally or alternately be used, such as bicycles, scooters, and pedestrians, which may be equipped with V2X technology.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104 (i.e., controllers 104-A through 104-G). However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors and/or trunk of the vehicle 102); a radio transceiver controller 104-C may be configured to communicate with key fobs, mobile devices, or other local vehicle 102 devices; an autonomous controller 104-D may be configured to provide commands to control the powertrain, steering, or other aspects of the vehicle 102; a climate control management controller 104-E may be configured to provide control of heating and cooling system components (e.g., compressor clutch, blower fan, temperature sensors, etc.); a global positioning system (GPS) controller 104-F may be configured to provide vehicle location information; and a human-machine interface (HMI) controller 104-G may be configured to receive user input via various buttons or other controls, as well as provide vehicle status information to a driver, such as fuel level information, engine operating temperature information, and current location of the vehicle 102.

The controllers 104 of the vehicle 102 may make use of various sensors 106 in order to receive information with respect to the surroundings of the vehicle 102. In an example, these sensors 106 may include one or more of cameras (e.g., advanced driver-assistance system (ADAS) cameras), ultrasonic sensors, radar systems, and/or lidar systems.

The vehicle bus 108 may include various methods of communication available between the vehicle controllers 104, as well as between the telematics control unit (TCU) 110 and the vehicle controllers 104. As some non-limiting examples, the vehicle bus 108 may include one or more of a vehicle controller area network (CAN), an Ethernet network, and a media-oriented system transfer (MOST) network. Further aspects of the layout and number of vehicle buses 108 are discussed in further detail below.

The TCU 110 may include network hardware configured to facilitate communication between the vehicle controllers 104 and with other devices of the system 100. For example, the TCU 110 may include or otherwise access a cellular transceiver 112 configured to facilitate communication with other vehicles 102 or with infrastructure. The TCU 110 may, accordingly, be configured to communicate over various protocols, such as with a communication network over a network protocol (such as Uu). The TCU 110 may, additionally, be configured to communicate over a broadcast peer-to-peer protocol (such as PC5), to facilitate C-V2X communications with devices such as other vehicles 102. It should be noted that these protocols are merely examples, and different peer-to-peer and/or cellular technologies may be used.

The TCU 110 may include various types of computing apparatus in support of performance of the functions of the TCU 110 described herein. In an example, the TCU 110 may include one or more processors 114 configured to execute computer instructions, and a storage 116 medium on which the computer-executable instructions and/or data may be maintained. A computer-readable storage medium (also referred to as a processor-readable medium or storage 116) includes any non-transitory (e.g., tangible) medium that participates in providing data (e.g., instructions) that may be read by a computer (e.g., by the processor(s)). In general, the processor 114 receives instructions and/or data, e.g., from the storage 116, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVA SCRIPT, PERL, etc.

The TCU 110 may be configured to include one or more interfaces from which vehicle information may be sent and received. This information can be sensed, recorded, and sent to the cloud server 124. In an example, the cloud server 124 may also include one or more processors (not shown) configured to execute computer instructions, and a storage medium (not shown) on which the computer-executable instructions and/or data may be maintained.

The TCU 110 may be configured to facilitate the collection of connected vehicle data and/or other vehicle information from the vehicle controllers 104 connected to the one or more vehicle buses 108. While only a single vehicle bus 108 is illustrated, it should be noted that in many examples, multiple vehicle buses 108 are included, with a subset of the controllers 104 connected to each vehicle bus 108. Accordingly, to access a given controller 104, the TCU 110 may be configured to maintain a mapping of which vehicle buses 108 are connected to which controllers 104, and to access the corresponding vehicle bus 108 for a controller 104 when communication with that particular controller 104 is desired.

The TCU 110 may be further configured to periodically transmit connected messages 122 for reception by other vehicles 102. For instance, the frequency may be on the order of every ten milliseconds. The TCU 110 may be further configured to receive connected messages 122 from other vehicles 102. In an example, the management of sending and receiving of connected vehicle data may be handled by a connected application 120 executed by the TCU 110. The connected messages 122 may include collected information retrieved from the controllers 104 over the vehicle buses 108. In many examples, the collected information data may include information useful for autonomous vehicle operations or driver-assistance vehicle operations. The connected vehicle data information retrieved by the TCU 110 may include, as some non-limiting examples, latitude, longitude, time, heading angle, speed, lateral acceleration, longitudinal acceleration, yaw rate, throttle position, brake status, steering angle, headlight status, wiper status, external temperature, turn signal status, vehicle length, vehicle width, vehicle mass, and bumper height. The connected vehicle data information may also include, weather data (such as ambient temperature, ambient air pressure, etc.), traction control status, wiper status, or other vehicle status information (such as the status of exterior vehicle lights, type of vehicle, antilock brake system (ABS) system status, etc.). In one example, the connected messages 122 may take the form of BSM messages as described in the society of automotive engineers (SAE) standard document J2735.

While not shown, in some examples traffic participants may additionally involve communication via one or more roadside units (RSUs). The RSU may be a device with processing capabilities and networking capabilities, and may be designed to be placed in proximity of the roadway 118 for use in communicating with the vehicles 102. In an example, the RSU may include hardware configured to communicate over the broadcast peer-to-peer protocol (such as PC5), to facilitate C-V2X communications with the vehicles 102. The RSU may, accordingly, be able to communicate with multiple vehicles 102 along a specific roadway 118 or in a specific area. The RSU may also have wired or wireless backhaul capability to allow for communication with other elements of a traffic control system, via e.g., Ethernet, or cellular connection to the cellular network infrastructure, for example over Uu interface.

The SAE J3161 standard specifies the minimum performance requirements for C-V2X BSMs. In general, BSMs may be transmitted using SPS, which is a reservation-based approach as opposed to the contention-based approach used by dedicated short range communication (DSRC). Using SPS, periodic transmissions are allocated on the spectrum, instead of requiring the sender to allocate resources periodically to send each transmission. This may improve efficiency for messages that will be periodically sent by a vehicle 102. It is also possible to send messages for non-periodic events. These are referred to herein as 1-shot transmissions. J3161/1 mandates the use of 1-shot transmissions intermittently based on another random counter between two and six. When this counter (referred to 1-shot counter) reaches zero, the vehicle 102 allocates a one-off set of resources to transmit the next BSM. Such 1-shot transmissions are intended to break a pattern of collisions that may be occurring.

Figures 2, 3:
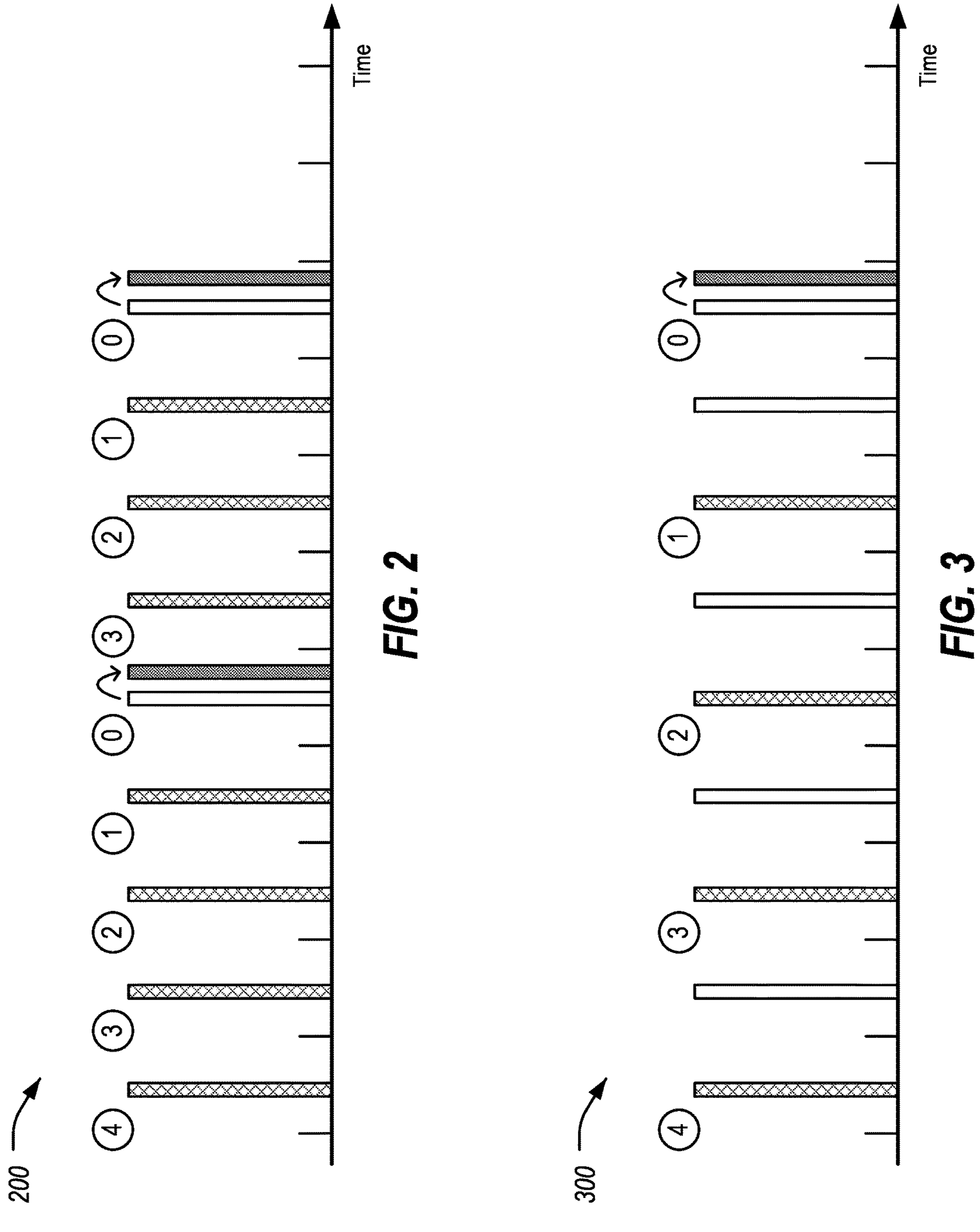
FIG. 2 illustrates an example of 1-shot transmission using a counter-based 1-shot approach.
FIG. 3 illustrates an alternate example of 1-shot transmission using the counter-based 1-shot approach under higher load conditions.

FIG. 2 illustrates an example 200 of 1-shot transmission using a counter-based 1-shot approach. In the illustrated example 200, the Max_ITT=100 ms, while the 1-shot counter ranges from two to six. Such settings may be appropriate for instances in which the level of load on the V2X frequencies is low. The 1-shot timer begins the example 200 at a value of four. For each time period, the 1-shot timer is decremented. The 1-shot transmission is performed responsive to the counter reaching zero. As shown, this occurs twice in the example 200.

FIG. 3 illustrates an alternate example 300 of 1-shot transmission using the counter-based 1-shot approach under higher load conditions. In the illustrated example 300, the Max_ITT=150 ms, while the 1-shot counter again ranges from two to six. Such settings may be appropriate for instances in which the level of load on the V2X frequencies is medium as opposed to low. As shown in the example 300 as opposed to the example 200, the 1-shot counter is tripped only once as opposed to twice. Logically, the higher the Max_ITT, the less frequent the 1-shot transmissions become, leading to higher IA values. Significantly, in higher density environments when a congestion control algorithm is invoked in and the frequency of connected message 122 transmission goes down (e.g., Max_ITT is increased), it can be seen that, in the counter-based 1-shot approach, gaps between the 1-shot transmissions goes up.

Figures 4, 5:
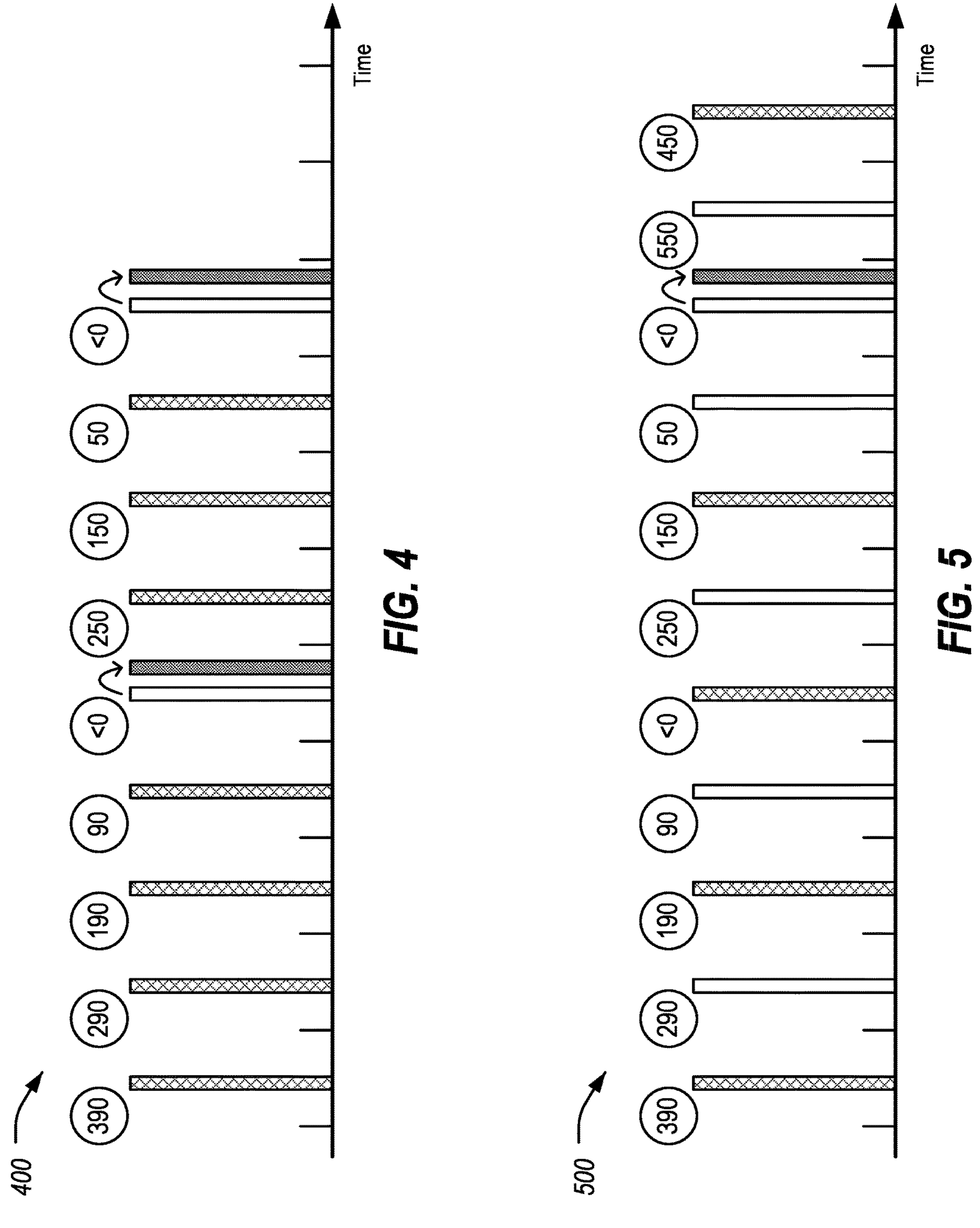
FIG. 4 illustrates an example of 1-shot transmission under load similar to in the example, using a duration-based 1-shot transmission approach rather than a counter-based 1-shot approach.
FIG. 5 illustrates an example of 1-shot transmission under load similar to in the example, using the duration-based 1-shot transmission approach.

FIG. 4 illustrates an example 400 of 1-shot transmission under load similar to in the example 200, using a duration-based 1-shot transmission approach rather than a counter-based 1-shot approach. In the duration-based approach, a min and max may be set as integer multiples of a minimum update interval T, e.g., T=100 ms. These values may be set such that the average represents the maximum time interval that the V2X application can tolerate for updates from other vehicles 102. This may ensure that any persistent collisions occurring in the SPS resources are broken by the 1-shot transmission, regardless of the other factors such as transmission rate variation (dictated by rate control) and SPS parameters.

As shown in the example 400, the Max_ITT=100 ms, while the 1-shot min and max range is from 200-600 ms. Responsive to the 1-Shot Timer reaching zero prior to the intended transmission, the 1-shot transmission is triggered. This occurs twice in the example 400.

FIG. 5 illustrates an example 500 of 1-shot transmission under load similar to in the example 300, using the duration-based 1-shot transmission approach. As shown in the example 500, the Max_ITT=150 ms, while the 1-shot min and max range is again from 200-600 ms. Responsive to the 1-Shot Timer reaching zero prior to the intended transmission, the 1-shot transmission is triggered. This occurs twice in the example 500. Accordingly, as compared to the reduced frequency of 1-shot transmissions in the counter-based 1-shot approach, in the counter-based 1-shot approach the 1-shot timer triggers the same number of 1-shot transmissions regardless of load.

Figure 6:
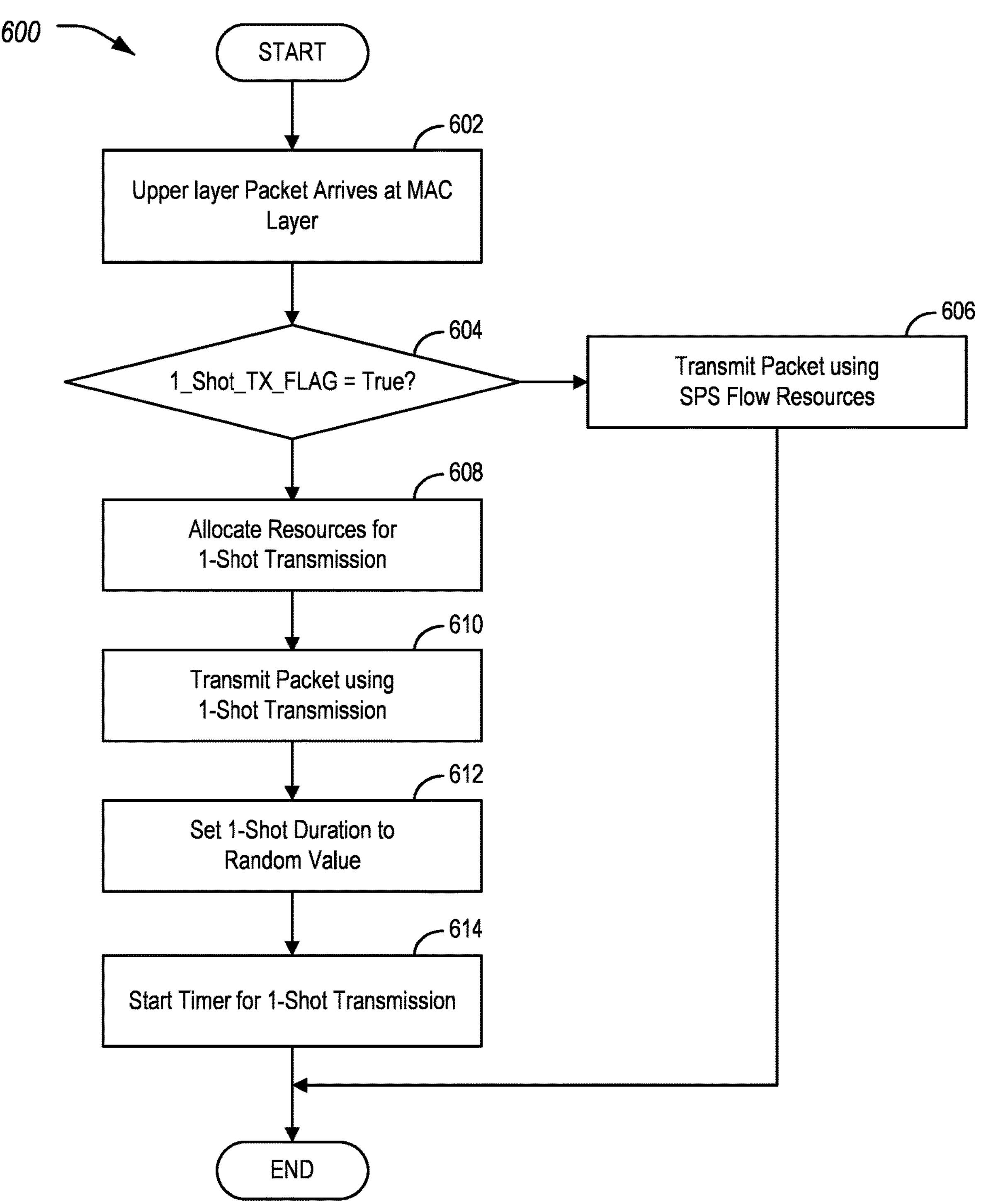
FIG. 6 illustrates an example process for performing aspects of the duration-based 1-shot messaging over V2X.

FIG. 6 illustrates an example process 600 for performing aspects of the duration-based 1-shot messaging over V2X. In an example, the process 600 may be performed by the TCU 110 of the vehicle 102, in the context of the other vehicles 102 of the system 100.

At operation 602, an upper-layer packet arrives at the MAC layer to the TCU 110. This packet may include data for transmission by the vehicle 102 in a connected message 122. In one example the connected message 122 may be a BSM. The transmission of the connected message 122 may be used to enable AV or driver assistance features for other vehicles 102.

At operation 604, the TCU 110 determines whether a 1-shot transmission flag is set. This flag may be set as shown in the process 700 below. If the 1-shot transmission flag is set, control passes to operation 606. Otherwise, control passes to operation 608.

At operation 606, the TCU 110 transmits the packet using SPS flow resources. These resources may have been pre-allocated by the TCU 110 of the vehicle 102 for the periodic transmission by the vehicle 102 of connected messages 122.

At operation 608, the TCU 110 allocates resources for the transmission of the 1-shot connected message 122. These resources are separate from the SPS flow, and accordingly may not have been allocated by the TCU 110 of the vehicles 102 for the periodic transmission by the vehicle 102 of connected messages 122.

At operation 610, the TCU 110 transmits the packet using 1-shot transmission. Accordingly, the 1-shot connected message 122 is sent by the vehicle 102. Because the 1-shot message is sent outside of the cadence of the transmission of the messages in the SPS flow, transmission of the 1-shot message may avoid the possibility of persistent collisions and consecutive packet losses that can occur with periodic transmission by multiple vehicles 102. Thus, by sending the 1-shot message in this approach, the system 100 may improve the ability of vehicles 102 to track other vehicles 102 in support of the V2X applications.

At operation 612, the TCU 110 sets the 1-shot duration counter to a random value. This random value may be set as a number of milliseconds within a minimum and a maximum range for transmission. As noted above, the min and max may be set as integer multiples of a minimum update interval T, e.g., T=100 ms. These values may be set such that the average represents the maximum time interval that the V2X application can tolerate for updates from other vehicles 102.

At operation 614, the TCU 110 starts the timer for the 1-shot transmission of the connected messages 122. The TCU 110 may also reset the 1-shot transmission flag to the unset state. When timed out, the 1-shot transmission flag may again be set, such that the 1-shot transmission may be designated to occur. After operation 614, the process 600 ends.

Figure 7:
FIG. 7 illustrates an example process for performing additional aspects of the duration-based 1-shot messaging over V2X.
Figure 7:
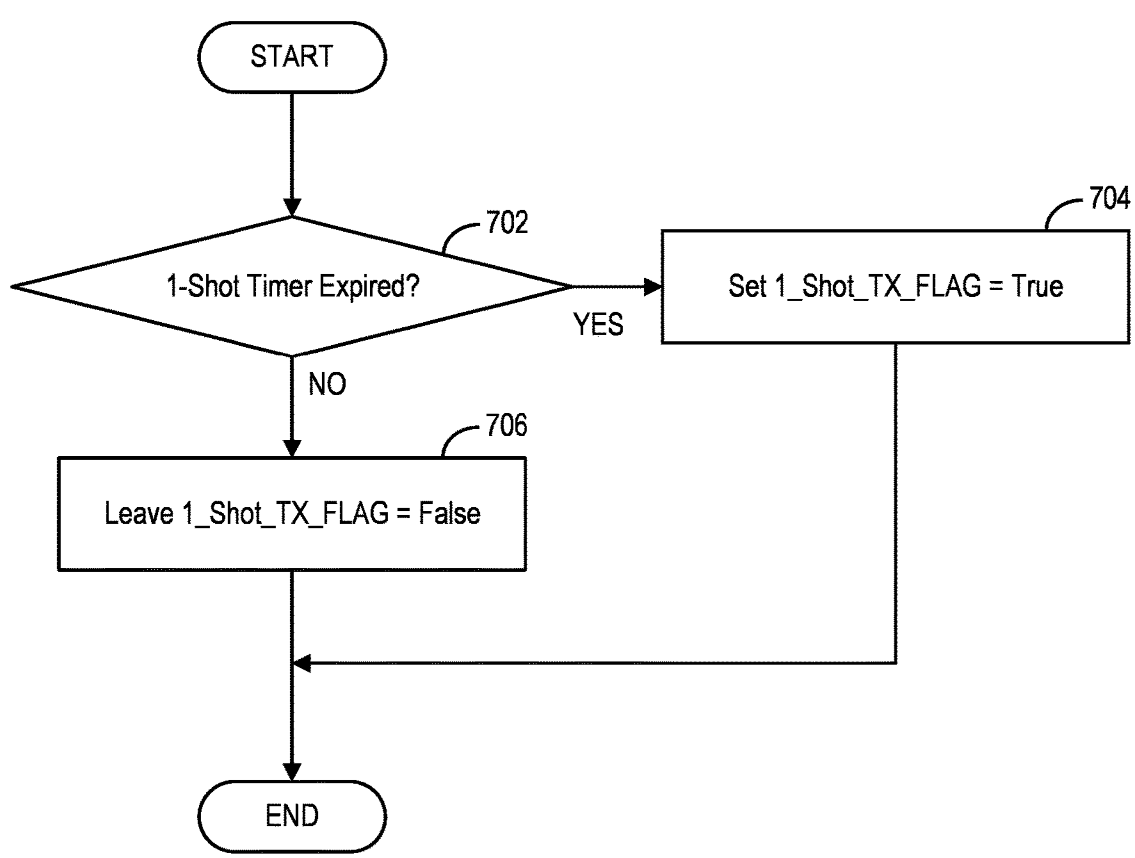

FIG. 7 illustrates an example process 700 for performing additional aspects of the duration-based 1-shot messaging over V2X. As with the process 600, the process 700 may be performed by the TCU 110 of the vehicle 102 in the context of the other vehicles 102 of the system 100. It should be noted that the process 700 typically executed in a loop wise manner, for instance as a callback function for a timer set with a predefined periodic callback period (e.g., the period T discussed above).

At operation 702, the TCU 110 determines whether the 1-shot timer has expired. In an example, the TCU 110 may determine whether the current time from the time that the timer was started has exceeded the amount of time set for the 1-shot duration counter at operation 612. In one implementation, this may be done periodically by subtracting the timer update interval from the counter at each cycle of a periodic message loop, such that once the timer counter is less than or equal to zero the timer has elapsed. If the timer has expired, control passes to operation 704, in which the TCU 110 sets the 1-shot transmission flag. If not, control passes to operation 706, at which the TCU 110 leaves the 1-shot transmission flag unset. After operation 706, the process 700 ends.

Thus, the disclosed approach ensures that persistent collisions occurring in the SPS resources are broken by the 1-shot transmission. As the disclosed approach is time-based rather than counter-based, it provides the same time interval statistics between consecutive 1-shot transmissions regardless of the congestion level, which is not true for the counter-based method. Accordingly, the disclosed approach is robust to variations in BSM rate, dictated by the rate control and traffic density. Moreover, the disclosed approach significantly improves IA and Inter-Packet Gap at high loads.

Figure 8:
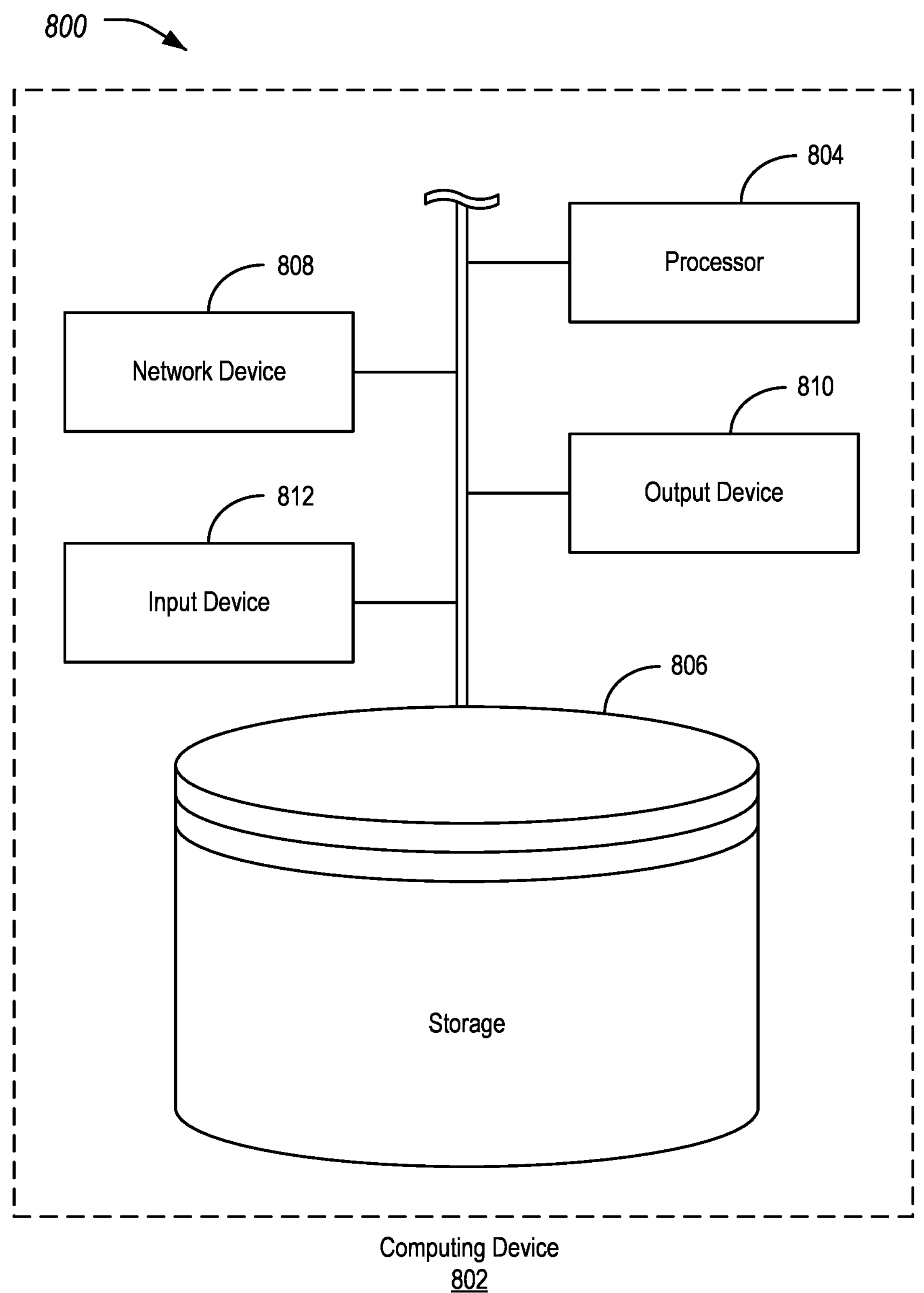
FIG. 8 illustrates an example of a computing device for performing duration-based 1-shot messaging over V2X.

FIG. 8 illustrates an example 800 of a computing device 802 for performing duration-based 1-shot messaging over V2X. Referring to FIG. 8, and with reference to FIGS. 1-7, the vehicles 102, controllers 104, TCU 110, and the cloud server 124 may be examples of such computing devices 802. As shown, the computing device 802 includes a processor 804 that is operatively connected to a storage 806, a network device 808, an output device 810, and an input device 812. It should be noted that this is merely an example, and computing devices 802 with more, fewer, or different components may be used.

The processor 804 may include one or more integrated circuits that implement the functionality of a central processing unit (CPU) and/or graphics processing unit (GPU).

In some examples, the processors 804 are a system on a chip (SoC) that integrates the functionality of the CPU and GPU. The SoC may optionally include other components such as, for example, the storage 806 and the network device 808 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stage (MIPS) instruction set families.

Regardless of the specifics, during operation the processor 804 executes stored program instructions that are retrieved from the storage 806. The stored program instructions, accordingly, include software that controls the operation of the processors 804 to perform the operations described herein. The storage 806 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 810. The output device 810 may include a graphical or visual display device, such as an electronic display screen, projector, printer, or any other suitable device that reproduces a graphical display. As another example, the output device 810 may include an audio device, such as a loudspeaker or headphone. As yet a further example, the output device 810 may include a tactile device, such as a mechanically raiseable device that may, in an example, be configured to display braille or another physical output that may be touched to provide information to a user.

The input device 812 may include any of various devices that enable the computing device 802 to receive control input from users. Examples of suitable input devices that receive human interface inputs may include keyboards, mice, trackballs, touchscreens, voice input devices, graphics tablets, and the like.

The network devices 808 may each include any of various devices that enable the vehicles 102 and cloud server 124 to send and/or receive data from external devices over networks. Examples of suitable network devices 808 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A system for performing duration-based 1-shot messaging, comprising:
- a transceiver; and
- a controller configured to
  - transmit a sequence of connected messages using Semi-Persistent Scheduling (SPS) of a predefined period,
  - set, for a 1-shot duration timer, a random duration value that defines an elapsed-time interval for the 1-shot duration timer, the random value being chosen as an integer number of the predefined period that is between a minimum and a maximum multiple of the predefined period,
- start the 1-shot duration timer based on the elapsed-time interval, and
- responsive to expiration of the 1-shot duration timer, allocate 1-shot resources for a 1-shot transmission, independent of SPS-allocated resources of the SPS, and transmit a next packet of the sequence of connected messages as a 1-shot message using the 1-shot resources instead of using the SPS-allocated resources of the SPS.

2. The system of claim 1, wherein the transceiver and the controller are embedded within a Vehicle-to-everything (V2X)-enabled vehicle in communication with other V2X-vehicles.

3. The system of claim 1, wherein the transceiver and the controller are embedded within a roadside unit in communication with V2X-enabled vehicles.

4. The system of claim 1, wherein the sequence of connected messages are formed in accordance with society of automotive engineers (SAE) standard document J2735.

5. The system of claim 1, wherein the minimum and the maximum multiple of the predefined period are set as integer multiples of the predefined period.

6. The system of claim 1, wherein the maximum multiple of the predefined period is set as a maximum time interval for a V2X application to receive updates from other vehicles.

7. The system of claim 1, wherein the predefined period is 100 ms, the minimum is twice the predefined period, and the maximum is six times the predefined period.

8. A method for performing duration-based 1-shot messaging, comprising
- transmitting a sequence of connected messages using Semi-Persistent Scheduling (SPS) of a predefined period;
- setting, for a 1-shot duration timer, a random duration value that defines an elapsed-time interval for the 1-shot duration timer, the random value being chosen as an integer number of the predefined period that is between a minimum and a maximum multiple of the predefined period;
- start the 1-shot duration timer based on the elapsed-time interval; and
- responsive to expiration of the 1-shot duration timer, allocating 1-shot resources for a 1-shot transmission, independent of SPS-allocated resources of the SPS, and transmitting a next packet of the sequence of connected messages as a 1-shot message using the 1-shot resources instead of using the SPS-allocated resources of the SPS.

9. The method of claim 8, wherein the sequence of connected messages are formed in accordance with society of automotive engineers (SAE) standard document J2735.

10. The method of claim 8, wherein the minimum and the maximum multiple of the predefined period are set as integer multiples of the predefined period.

11. The method of claim 8, wherein the maximum multiple of the predefined period is set as a maximum time interval for a V2X application to receive updates from other vehicles.

12. The method of claim 8, wherein the predefined period is 100 ms, the minimum is twice the predefined period, and the maximum is six times the predefined period.

13. A y computer-readable medium comprises instructions for performing duration-based 1-shot messaging that, when executed by a controller in communication with a V2X transceiver, cause the controller to perform operations including to:
- transmit a sequence of connected messages using Semi-Persistent Scheduling (SPS) of a predefined period;
- set, for a 1-shot duration timer, a random duration value that defines an elapsed-time interval for the 1-shot duration timer, the random value being chosen as an integer number of the predefined period that is between a minimum and a maximum multiple of the predefined period;
- start the 1-shot duration timer based on the elapsed-time interval; and
- responsive to expiration of the 1-shot duration timer, allocate 1-shot resources for a 1-shot transmission, independent of SPS-allocated resources of the SPS, and transmit a next packet of the sequence of connected messages as a 1-shot message using the 1-shot resources instead of using the SPS-allocated resources of the SPS.

14. The medium of claim 13, wherein the transceiver and the controller are embedded within a Vehicle-to-everything (V2X)-enabled vehicle in communication with other V2X-vehicles.

15. The medium of claim 13, wherein the transceiver and the controller are embedded within a roadside unit in communication with V2X-enabled vehicles.

16. The medium of claim 13, wherein the sequence of connected messages are formed in accordance with society of automotive engineers (SAE) standard document J2735.

17. The medium of claim 13, wherein the minimum and the maximum multiple of the predefined period are set as integer multiples of the predefined period.

18. The medium of claim 13, wherein the maximum multiple of the predefined period is set as a maximum time interval for a V2X application to receive updates from other vehicles.

19. The medium of claim 13, wherein the predefined period is 100 ms, the minimum is twice the predefined period, and the maximum is six times the predefined period.

* * * * *